(12) United States Patent
Bourdelais et al.

(10) Patent No.: US 7,009,771 B2
(45) Date of Patent: Mar. 7, 2006

(54) OPTICAL ELEMENT CONTAINING AN OPTICAL SPACER

(75) Inventors: Robert P. Bourdelais, Pittsford, NY (US); Cheryl J. Kaminsky, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 102 days.

(21) Appl. No.: 10/147,777

(22) Filed: May 16, 2002

(65) Prior Publication Data

US 2003/0214720 A1 Nov. 20, 2003

(51) Int. Cl.
 *G02B 5/02* (2006.01)
(52) U.S. Cl. ............ 359/599; 359/454; 359/707
(58) Field of Classification Search ........... 359/599, 359/613–614, 619–624, 626, 454–456, 707; 349/112–113, 62, 64, 67, 95; 362/31
 See application file for complete search history.

(56) References Cited

U.S. PATENT DOCUMENTS 5,247,390 A * 9/1993 Hed .................... 359/599
5,828,492 A * 10/1998 Moser et al. ............ 359/575
5,944,405 A * 8/1999 Takeuchi et al. ......... 362/31
6,063,552 A * 5/2000 Bourdelais et al. ...... 430/363
6,093,521 A * 7/2000 Laney et al. ........... 430/363
6,124,974 A    9/2000 Burger ................. 359/619
6,130,777 A * 10/2000 Yamashita et al. ....... 359/456
6,270,697 B1   8/2001 Myers et al. ........... 264/1.34
6,339,458 B1 * 1/2002 Ohkawa ............... 349/65
6,831,714 B1 * 12/2004 Masaki et al. .......... 349/112

FOREIGN PATENT DOCUMENTS

JP    2000019307 A    4/1998

* cited by examiner

*Primary Examiner*—Mark A. Robinson
*Assistant Examiner*—Lee Fineman
(74) *Attorney, Agent, or Firm*—Arthur E. Kluegel

(57) ABSTRACT

Disclosed is an optical element containing a rough surface having a roughness average equal to at least 5 micrometers wherein the rough surface contains at least two roughness populations in which the roughness average of the at least two populations varies by at least 8 micrometers. The invention provides an optical element containing an integral optical spacer while simultaneously providing scratch and impact resistance.

35 Claims, 6 Drawing Sheets

OPTICAL ELEMENT CONTAINING AN OPTICAL SPACER

CROSS REFERENCE TO RELATED APPLICATIONS

This application is one of a group of five applications co-filed on May 16, 2002 under Ser. Nos. 10/147,703; 10/147,776; 10/147,777; 10/147,775 and 10/147,659, the contents of which are incorporated herein by reference.

FIELD OF THE INVENTION

The invention relates to an optical element suitable for diffusion of specular light and the control of the light diffusion intensity containing a rough surface having a roughness average equal to at least 5 micrometers wherein the rough surface contains at least two roughness populations in which the roughness average of the at least two populations varies by at least 8 micrometers.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need to for a separate film. In the case of light management in a LCD, this increases efficiency by removing an interface (which causes reflection and lost light).

Prior art optical elements which include light diffusers, light directors, light guides, brightness enhancement films and polarizing films typical comprise a repeating ordered geometrical pattern or random geometrical pattern. The geometrical patterns typically have a single size distribution in order to accomplish the intended optical function. An example is a brightness enhancement film for LC displays utilizing precise micro prisms. The micro prism geometry has a single size distribution across the sheet and when utilized with a polarizing sheet, the top of the micro prisms are in contact with the polarizing sheet. When these prior art optical elements are used as a system, as is the case in a liquid crystal display, the optical elements are typically in optical contact. The focal length of the prior art optical elements, in combination with other optical elements, typically comprise the thickness of the optical element.

Prior art optical spacer materials typically comprise thin, transparent polymer sheets to provide optical spacing between two optical components. Optical spacer materials are utilized to change the focal length of an optical component or to provide protection between two optical components. It would be desirable for an optical component to contain an integral optical spacer.

U.S. Pat. No. 6,270,697 (Meyers et al.), blur films are used to transmitted infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. While the materials disclosed in U.S. Pat. No. 6,266,476 shape and collimate light and therefore are not efficient diffusers of light particularly for liquid crystal display devices. Further, the micro-structures are of a single size distribution.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

There remains a need for an integral optical spacer for optical components to provide a variable focal length and scratch and impact resistance between two optical components.

SUMMARY OF THE INVENTION

The invention provides an optical element containing a rough surface having a roughness average equal to at least 5 micrometers wherein the rough surface contains at least two roughness populations in which the roughness average of the at least two populations varies by at least 8 micrometers. The invention also provides a back lighted imaging media, a liquid crystal display component and device, and method of making them.

The invention provides an optical element containing an integral optical spacer while simultaneously providing scratch and impact resistance.

DETAILED DESCRIPTION OF THE INVENTION

Figure 1:
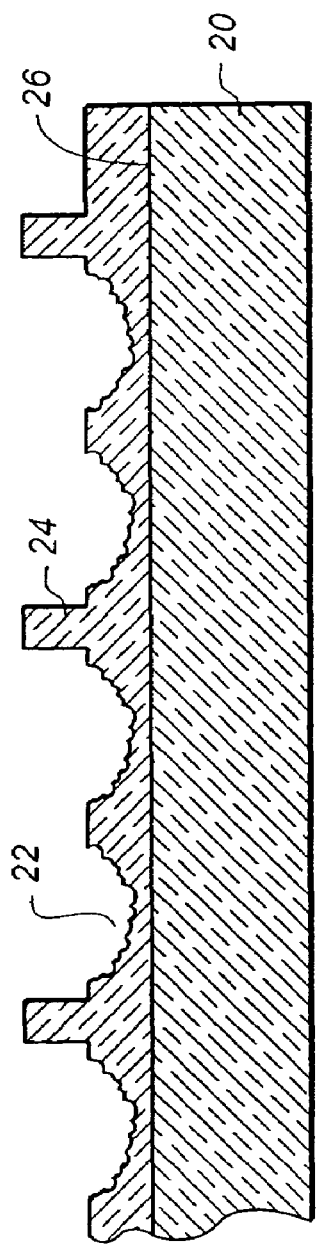
FIG. 1 illustrates a cross section of a complex lens formed on a transparent base material containing an optical spacer suitable for use in a liquid crystal display device.

The invention has numerous advantages over prior practices in the art. The invention provides an optical element such as a light diffuser, light guide or a focusing film with an integral optical spacer. An optical spacer provides a method to control the focal length of an optical component utilized in an optical system such as an LC device, by providing a precision spacing between each of the optical components. By providing an integral optical spacer on the optical element of the invention, the spacing in an optical system can be carefully controlled. Further, by providing an optical spacer, the optical element of the invention provides scratch resistance and impact resistance as the functional surface of the optical element is spaced from the other optical components in a optical system. The integral optical spacer of the invention also provides a specified air gap for optical elements that require an air gap for light diffusion, for example. By providing a specified air gap, the efficiency of light diffusers is improved as all of the diffusion geometry is in contact with air.

By providing an optical spacer of the invention, the optical element is protected from handling damage or damage during assembly of optical components. The optical spacer can also be used to provide protection to the optical element against fingerprints and scratching that is typically encountered on the outermost layer in a visible display such as a cell phone, projection television or automobile display panel. Scratches and fingerprints reduce the optical utility of such devices.

The optical spacer of the invention is integral to the optical elements avoiding the need for a transparent spacer sheet. Further, since the optical spacer is integral to the optical element, reflection and absorption losses through the prior art transparent sheet, which typically range from 2 to 5% loss in transmitted light energy are avoided. The invention also provides optical spacer that have a specific geometry to provide both optical spacing and optical function such as light shaping or light directing. Additionally, the elimination of a transparent optical spacer, avoids unwanted interference patterns which form when transmitted light passes through two partially reflective surfaces. The unwanted interference patterns are unwanted as they form colored rings visible in LC devices.

In a preferred form, the invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter, or holding the level of brightness the same allows the power consumption for the back light to be reduced, therefore extending the lifetime of battery powered liquid crystal devices that are common for note book computers. The surface lenslet structure polymer layer of the invention can be easily changed to achieve the desired diffusion and light transmission requirements for many liquid crystal devices thus allowing the invention materials to be responsive to the rapidly changing product requirements in the liquid crystal display market. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means the percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y direction in the plane of the film. The term "pattern" means any predetermined arrangement of lenses whether regular or random.

An optical spacer generally is a transparent material such as glass or polymer that provides a specified space between two optical components. An example of an optical spacer is a light diffuser comprising a rough surface using the index of refraction difference between the air and the light diffuser to provide light diffusion. If the air is eliminated between the diffuser, the light diffuser will loose efficiency. In an optical system requiring a light diffuser, the air gap, that is the space between the light diffuser and the next optical component is critical for the performance of the light diffuser.

An integral geometric optical spacer is a geometrical shape that has a height greater than the functional optical surface, such as a light director or a light diffuser and yet is part of the surface. For the invention materials, the integral geometric optical spacer is formed simultaneously with the functional optical element and thus is integral to the optical element.

Roughness average is the arithmetic average height calculated over the entire measured array. The arithmetic mean is the mean of the absolute values of the surface features from the mean plane. The measured array typically consists of 10 mm and the units are expressed in micrometers. Roughness average can be measured by contact stylus or laser methods.

Optical components are components that have optical utility such as light diffusion, light direction, light guiding, color filters, polarizing films and the like, which can be used in combination with the optical element of the invention. An example is a simple system designed to diffuse specular light, accomplished by a light diffuser and a light direction film, accomplished by a prism film. In this example, the light diffuser film and the light direction film are considered optical components.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, micro-voided polymer film, or coating the film with matte resins or beads. The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random micro-lenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, offset from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, or that the direction of the peak light transmission is not along the direction θ=0°, but is in a direction non-normal to the surface. There are least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

An optical element containing an optical spacer provides a air gap, specified focal length and scratch and impact resistance. An optical element containing a rough surface having a roughness average equal to at least 5 micrometers wherein the rough surface contains at least two roughness populations in which the at least two populations vary by at least 8 micrometers is preferred. The optical element with two roughness populations provides at least one functional optical surface such as a light diffuser or light guide and another population that provides spacing in an optical system consisting of more than one optical component. By providing at least one roughness population that is higher than the others, the higher population provides the optical contact with other optical components while the other roughness population provides the optical utility such as light direction or light diffusion. Further, the two populations preferably vary by at least 8 micrometers because spacing less than 5 micrometers can result in unwanted light interference patterns.

Precision control of the air gap between the optical element of the invention and other optical components can greatly improve the efficiency and the variability of the optical element in an optical system. An example is visible light diffusion films containing an integral optical spacer. By providing an optical spacer between a surface diffuser and other optical components, the spread of the diffused light into other optical components can be specified and controlled by the height of the optical spacer compared to the light diffusing element. A specular light source, such as a laser, can be surface diffused into a narrow cone without the use of a spacer and can be surfaced diffused into a broad cone using a spacer that is 5 to 20 times larger than the diffusion element. A narrow light diffusion cone will tend to provide narrow viewing angle in an LC device while a broad cone will provide a larger viewing angle. Both narrow cone diffusers and broad cone diffusers have utility depending on the light diffusion application.

An optical element that comprises the at least two roughness populations applied to both the front and back side of the sheet is preferred. By applying the at least two roughness populations to both sides, the optical spacing feature is present on both sides. A two-sided optical spacer provides for spacing when the optical element is contained between two additional optical components such as a polarizing sheet and a light diffuser.

In a preferred embodiment, the at least two roughness populations vary by at least 250 micrometers. By providing a optical spacing of at least 250 micrometers, the optical element of the invention has a sufficient air gap for light diffusion, light guiding or light directing and has a sufficient gap for scratch and impact resistance. In a more preferred embodiment of the invention, the at least two roughness populations vary by at least 75 micrometers. An optical spacing of at least 75 micrometers has been shown to provide a sufficient air gap for light diffusion, light directing and light guiding and provide a sufficient spacing for the focal length of directing lenses.

In a preferred embodiment of the invention, the at least two roughness populations are ordered. By providing an ordered roughness population, light directing and light guiding can be achieved by the optical element of the invention. In another preferred embodiment of the invention, the at least two roughness populations are random. By providing a random roughness population, light diffusion can be achieved by the optical element of the invention. Further, a random roughness has been shown to reduce optical patterns that might result from an ordered roughness. In another preferred embodiment of the invention, one of the roughness populations is ordered. By providing at least one ordered population, the spacer can be random, reducing unwanted transmission patterns and the optical element can be ordered to provide light direction and light guiding.

The optical element of the invention preferably comprises a geometrical spacer. A geometrical spacer, greater in height that the functional optical element, provides a precise air gap when used in combination with other optical components such as brightness enhancement films and polarizing films. A geometrical shape provides mechanical and optical utility for both reflected and transmitted light energy. In a preferred embodiment of the invention, the geometric spacer of the invention comprises a cylinder. A cylinder provides for specular light transmission and is impact resistant. Further, the end of the cylinder provides excellent contact points when the optical element of the invention is used in combination with other optical components The polymer cylinders suitably have a height at least 50 micrometers greater than the complex lenses and typically have a diameter of about 25 micrometers and a frequency of about 20 mm.

In another preferred embodiment of the invention, the geometrical spacer comprises a sphere. The sphere provides a precision gap as well as light diffusion as transmitted light is diffused from the curved surface of the geometrical spacer. In another preferred embodiment of the invention, the geometrical spacer comprises a cube. A cubic geometrical spacer provides impact resistance as well as a precision optical spacing. In another preferred embodiment, the geometrical spacer comprises a pyramid. A pyramid provides a precision optical gap as well as light directing. A 45 degree pyramid in air will tend to focus transmitted light from the base of the pyramid onto the top of the pyramid providing both optical spacing as well as light directing.

The geometrical spacer preferably comprises a polymer. A polymeric geometrical spacer provides high light transmission properties, is inexpensive and can be easily formed into a geometrical spacer. Preferred polymers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used. Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties and have been shown to be soft and scratch resistant.

In another preferred embodiment, the geometrical spacer comprises an organic particle. Organic particles such as metals, silica, clay and the like are useful as a spacer when high temperatures, such as those encountered in hot climates or industrial applications are required as the temperature resistance is much high when compared to organic spacer material such as polymers.

The geometrical spacer of the invention preferably has a light transmission greater than 80%. A light transmission greater than 80% provides for transmitted light efficiency suitable for LC devices and reduces unwanted optical "dead spots" were geometrical spacers can be visible in transmitted light. The geometrical spacer of the invention preferably has a haze greater than 60%. By providing a spacer that has a haze of greater than 60%, the transmitted visibility of the spacer is reduced. In a preferred form, the geometrical light spacer of the invention comprises a diffusion element such as curved lens, a complex lens or an embossed surface for the diffusion of reflected and transmitted light.

The geometrical spacer of the invention has a frequency of greater than 1.0 mm. At a frequency of greater than 1.0 mm a precision air gap is formed between the invention materials and other optical components and the frequency is on the order of 100 to 1000 times larger than typical optical features to accomplish light direction, light shaping or light diffusion. In another preferred embodiment, the geometrical spacer has a frequency of between 5 and 25 mm. In this range, it has been shown that a precision air gap is formed and maintained in a portable LC device. With a large geometrical spacing, a spacing that exceeds 100 mm, the air gap precision begins to degrade as the spacing is too large to avoid the bend of optical components into the unsupported space between the geometrical spacers.

A precision air gap between a surface light diffuser and additional optical components is important to maintain the efficiency of the light diffuser. Complex lenses containing at least two roughness populations wherein the at least two populations differ by at least 8 micrometers have been shown to be very efficient light diffusers compared to light diffusers whose light diffusion element is in optical contact with other optical components. A transparent polymeric film having a top and bottom surface comprising a plurality of convex or concave complex lenses on the surface of the transparent polymeric film is preferred. Curved concave and convex polymer lenses have been shown to provide very efficient diffusion of light. Further, the polymer lenses of the invention are transparent, allowing a high transmission of light allowing the brightness of LC displays to emit more light.

The concave or complex lenses on the surface of the polymer film are preferably randomly placed. Random placement of lenses increases the diffusion efficiency of the invention materials. Further, by avoiding a concave or convex placement of lenses that ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

In one embodiment of the invention, convex lenses are present on the top surface and convex lenses are present on the bottom surface of the transparent polymeric film. The placement of convex lenses on both sides of the polymer film creates stand off from other adjacent films providing the necessary air gap required for efficient diffusion by the lenses.

In another embodiment of the invention, convex lenses are present on the top surface and concave lenses are present on the bottom surface of the transparent polymeric film. The placement of convex lenses on the top side of the polymer film creates stand off from other adjacent films providing the necessary air gap required for efficient diffusion by the lenses. The placement of concave lenses on the bottom side of the polymer film creates a surface that can be in optical contact with the adjacent films and still effectively diffuse the light.

In another embodiment of the invention, concave lenses are present on the top surface and concave lenses are present on the bottom surface of the transparent polymeric film. The placement of concave lenses on both sides of the polymer film creates a surface that can be in optical contact with the adjacent films on either side and still effectively diffuse the light.

In another embodiment of the invention, concave lenses are present on the top surface and convex lenses are present on the bottom surface of the transparent polymeric film. The placement of concave lenses on the top side of the polymer film creates a surface that can be in optical contact with the adjacent films and still effectively diffuse the light. The placement of convex lenses on the bottom side of the polymer film creates stand off from other adjacent films providing the necessary air gap required for efficient diffusion by the lenses.

Preferably, the concave or convex lenses have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

The preferred transparent polymeric film has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the diameter of the smaller lenses is preferably less than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. Most preferred are the minor lenses having a width in the x and y direction between 3 and 8 microns. This range has been shown to create the most efficient diffusion.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the transparent polymeric film wherein the polymeric film comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the invention, the transparent polymeric film wherein the polymeric film comprises a carbonate repeating unit. Polycarbonates have high optical transmission values compared to polyolefin polymers and therefore can improve the brightness of display devices.

In another embodiment of the invention, the transparent polymeric film wherein the polymeric film comprises an olefin repeating unit. Polyolefins are low in cost and have good strength and surface properties.

In another embodiment of the invention, the transparent polymeric film wherein the polymeric film comprises a tri acetyl cellulose. Tri acetyl cellulose has both high optical transmission and low optical birefringence allowing the diffuser of the invention to both diffuse light and reduce unwanted optical patterns.

The preferred diffuse light transmission of the diffuser material of the invention is greater than 50%. Diffuser light transmission less than 45% does not let a sufficient quantity of light pass through the diffuser, thus making the diffuser inefficient. A more preferred diffuse light transmission of the lenslet film is greater than between 80 and 95%. An 80% diffuse transmission allows the LC device to improve battery life and increase screen brightness. The most preferred diffuse transmission of the transparent polymeric film is greater than 92%. A diffuse transmission of 92% allows diffusion of the back light-source and maximizes the brightness of the LC device significant improving the image quality of an LC device for outdoor use where the LC screen must compete with natural sunlight.

Preferably, the concave or convex lenses are semi-spherical meaning that the surface of each lenslet is a sector of a sphere, but not necessarily a hemisphere. This provides excellent even diffusion over the x y plane. The semi-spherical shaped lenses scatter the incident light uniformly, ideal for a backlit display application where the display area need to be lit uniformly.

In another embodiment of the invention, the concave or convex lenses are aspherical meaning that width of the lenses differ in the x and y direction. This scatters light selectively over the x y plane. For example, a particular x y aspect ratio might produce an elliptical scattering pattern. This would be useful in the front of a LC display, spreading the light more in the horizontal direction than the vertical direction for increased viewing angle.

The convex or concave lenses preferably have a height/diameter ratio of between 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of between 0.25 to 0.48. It has been proven that the most efficient diffusion occurs in this range.

The number of minor lenses per major lens is preferably between 2 and 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is 5 to 18 minor lenses per major lens. This range has been shown to produce the most efficient diffusion.

The thickness of the transparent polymeric film preferably is less than 250 micrometers or more preferably between 12.5 and 50 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved by reducing light transmission. The more preferred thickness of the light diffuser is between 12.5 and 50 micrometers which further allows the light diffuser to be conviniently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to withstand the rigors of the assembly process compared to prior art cast diffusion films which are delicate and difficult to assemble.

FIG. 1 illustrates a cross section of a complex lens formed on a transparent base material containing geometrical spacers suitable for use in a liquid crystal display device. Light diffusion film 12 containing complex lenses 22 and geometrical spacers 24 comprises transparent polymer base 20, onto which concave major lens 22 is present on the surface of transparent polymer base 26. Polymer geometrical spacer 24 is integral to the surface, that is part of the surface, of the light diffusion film 12 and above the surface of the complex lens 22. The frequency of the polymer geometrical spacers 24 is the distance between the polymer geometrical spacer 24. Additional optical components such as a prism film would contact light diffuser 12 at the exposed surface of the polymer geometrical spacer 24.

Figure 2:
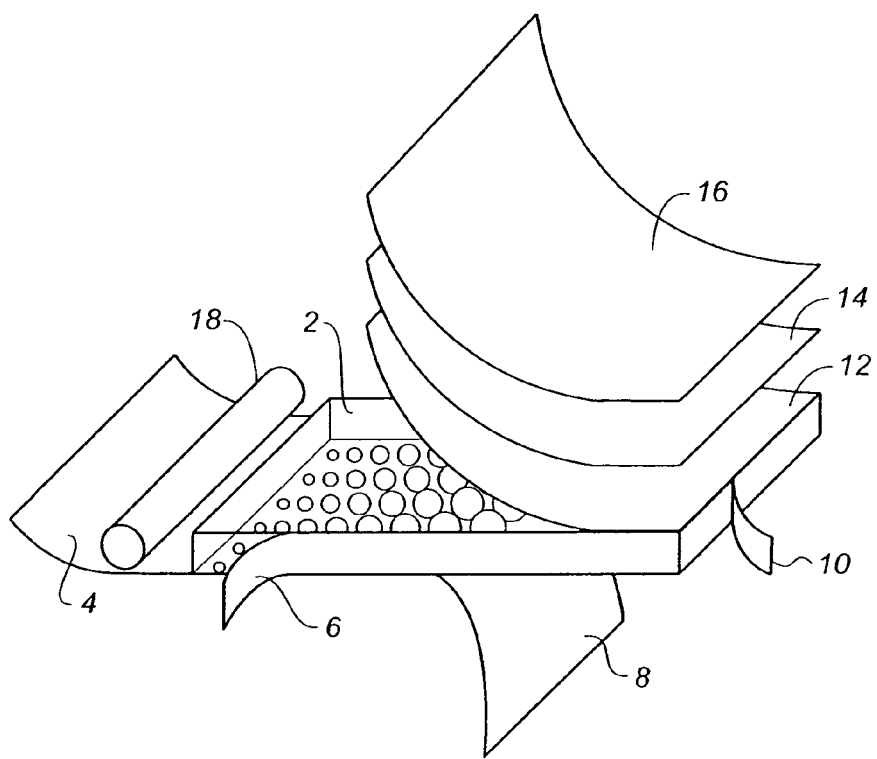
FIG. 2 illustrates a liquid crystal display device with a complex lens light diffuser containing an optical spacer.

FIG. 2 illustrates a liquid crystal display device with a light diffuser. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. Light diffusion film 12 containing complex lenses 22 and geometrical spacers 24 in the form of a transparent polymeric film is utilized to diffuse light energy exiting the light guide in a direction perpendicular to the light diffuser. Brightness enhancement film 14 is utilized to focus the light energy into polarization film 16. The light diffusion film containing complex lenses and geometrical spacers 12 is in contact with brightness enhancement film 14.

Figure 3:
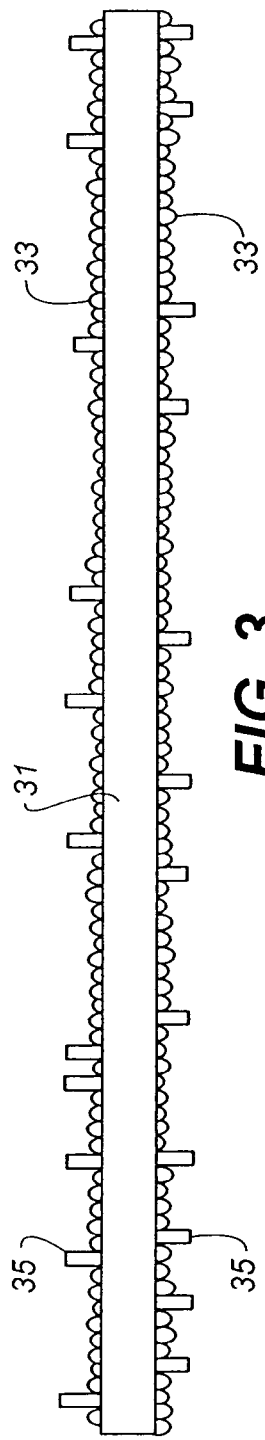
FIG. 3 is a schematic of a film with a rough surface with two roughness populations on the top and bottom of the film.

FIG. 3 shows a schematic of a cross-section of a film with a rough surface with two roughness populations on the top and bottom of the film 31. The film 31 has curved lenses 33 and cylindrical geometric spacers 35 on both the top and bottom surfaces of the film 31.

Figure 4:
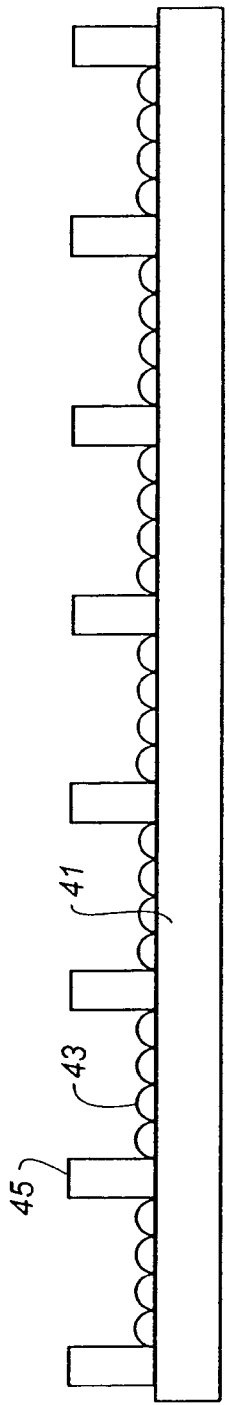
FIG. 4 is a schematic of a film with a rough surface with two roughness populations that are ordered.

FIG. 4 shows a schematic of a cross-section of a film with a rough surface with two roughness populations on one surface of the film where both of the populations are ordered. The film 41 has ordered curved lenses 43 and ordered cylindrical geometric spacers 45 on the top surface of the film 41.

Figure 5:
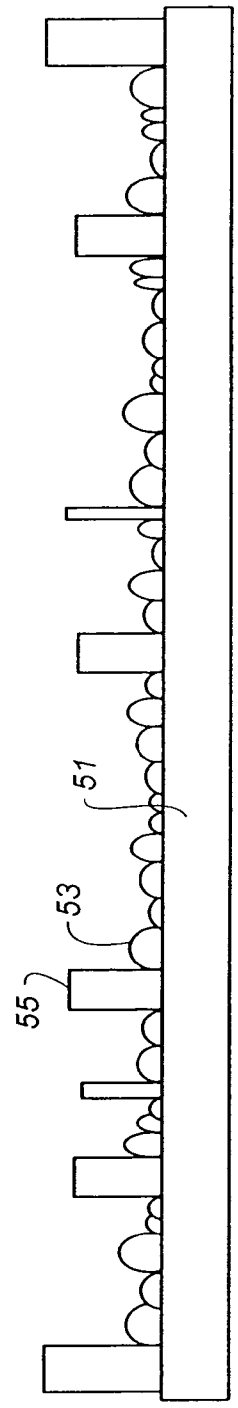
FIG. 5 is a schematic of a film with a rough surface with two roughness populations that are random.

FIG. 5 shows a schematic of a cross-section of a film with a rough surface with two roughness populations on one surface of the film where both of the populations are random. The film 51 has random curved lenses 53 and random cylindrical geometric spacers 55 on the top surface of the film 51.

Figure 6:
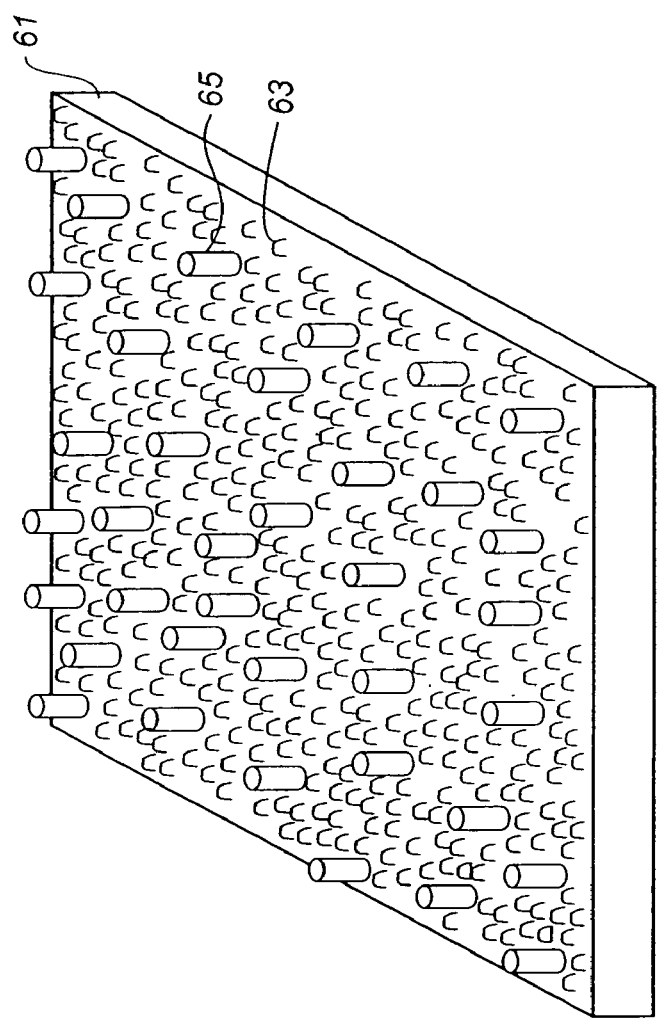
FIG. 6 is a schematic of a film with a rough surface with two roughness populations wherein one of the roughness populations is cylindrical.

FIG. 6 shows a schematic of a top view of a film with a rough surface with two roughness populations on one surface of the film. The film 61 has curved lenses 63 and cylindrical geometric spacers 65 on the top surface of the film 61.

Figure 7:
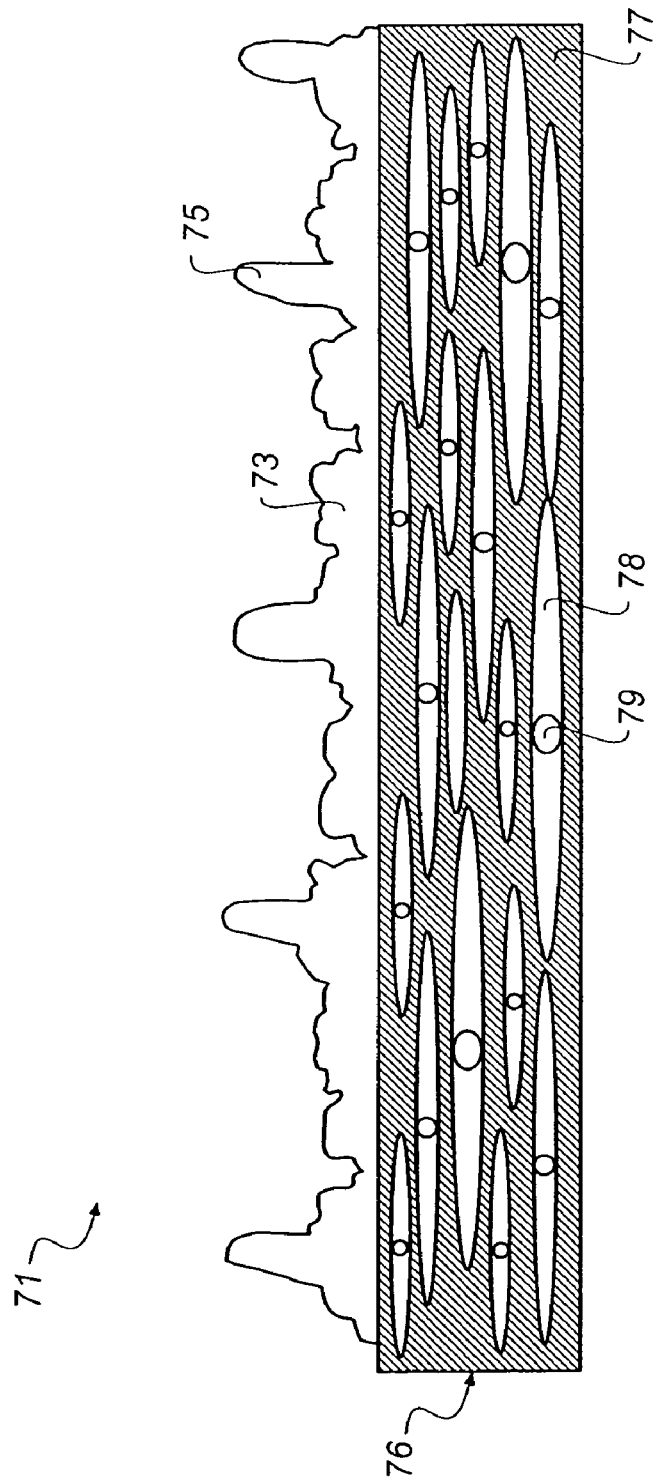
FIG. 7 is a schematic of a film with a rough surface with two roughness populations wherein one of the roughness populations comprises complex lenses randomly distributed on the surface and further comprises a thermoplastic material with microvoids.

FIG. 7 shows a schematic of a cross-section of a film 71 with a rough surface with two roughness populations on one surface of the film and a thermoplastic layer 76 containing thermoplastic polymeric material 77 and microvoids 78 having a substantially circular cross-section in a plane perpendicular to the direction of light-travel. The film 71 has a rough surface that contains two roughness populations; one of the roughness populations comprise complex lenses 73 and the other population comprise cylindrical geometric spacers 75. The film 71 also contains a thermoplastic layer 76 containing thermoplastic polymeric material 77 and microvoids 78. The microvoids contain organic microspheres 79. These microspheres are substantially free of scattering inorganic particles. The microvoids also contain air such that the difference in refractive index between the thermoplastic polymeric material and the microvoids is greater than 0.2.

Figure 8:
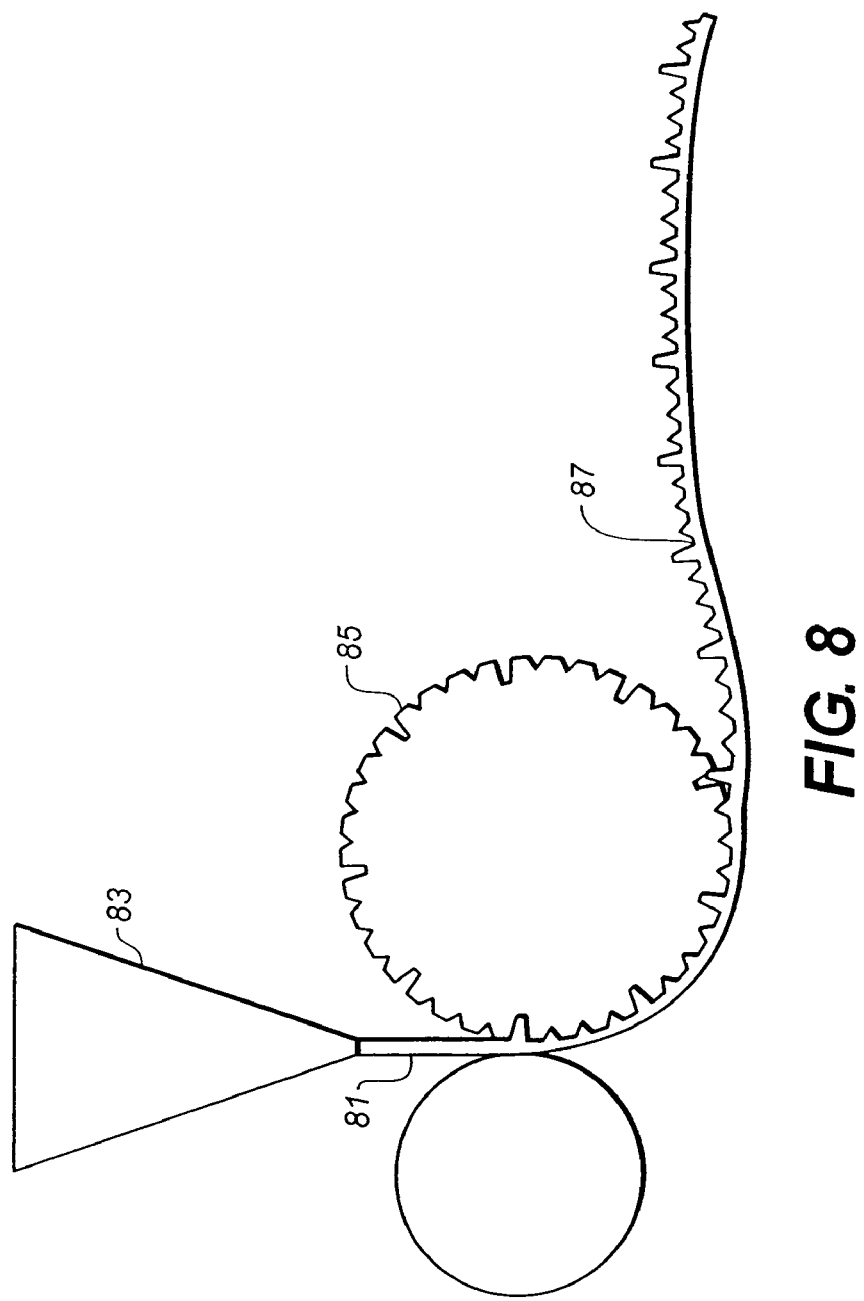
FIG. 8 is a schematic of the process to create a film with a rough surface comprising at least two roughness populations.

FIG. 8 shows a schematic of a method for forming at least two roughness populations in a desired pattern on a transparent support. Molten polymeric material 81 is extruded from a slit die 83 cast onto a chill roll 85, which is a form having a roughness pattern corresponding to the negative of the desired pattern on the film. The molten polymeric material flows into the pattern on the chill roll 85 and is rapidly quenched. The film with two roughness populations 87 is then stripped from the chill roll 85.

Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425.

Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties.

Preferred polyesters for the transparent polymeric film of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides for the transparent polymeric film include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl)Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuser film may also be used in conjunction with another light diffuser, for example a bulk diffuser, a lenticular layer, a beaded layer, a surface diffuser, a holographic diffuser, a micro-structured diffuser, another lens array, or various combinations thereof The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or α metal oxide or a filler.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n * d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn.* d since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film containing two population of roughness was developed. The preferred approach comprises the steps of providing a positive master chill roll having a plurality of complex lenses. The diffusion film is replicated from the master chill roller by casting a molten polymeric material to the face of the chill roll and transferring the polymeric material with two roughness populations with complex lens structures onto a transparent polymeric film. In another embodiment of the invention, a geometrical spacer is formed by forming a roller containing the complex lens geometry and they machining in a geometrical shape such as a cylinder to form a roll containing both the random complex lens geometry and number of cylinder shaped geometrical spacers.

A chill roller is manufactured by a process including the steps of electroplating a layer of copper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The optical element and the geometrical spacer of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

In another embodiment, polymer beads of differing mean diameters are preferably coated in a matrix on a polymer transparent web. The mean diameter difference between the two populations of beads provides the desired geometrical spacing between the optical element of the invention and other optical components. For example, two populations of polystyrene polymer beads coated in a PVA matrix, one at 10 micrometers and the other at 50 micrometers, provides a 40 micrometer geometrical spacer on the surface of the transparent polymer web.

The optical spacers of the invention are preferably located on the surface of a voided polymer light diffuser. By providing an optical spacer, the diffusion cone of the voided polymer can be precisely controlled. The invention provides a film that scatters the incident light uniformly. The oriented film of the present invention can be produced by using a conventional film-manufacturing facility in high productivity. The invention utilizes a voided thermal plastic layer containing microvoids. Microvoids of air in a polymer matrix are preferred and have been shown to be a very efficient diffuser of light compared to prior art diffuser materials which rely on surface roughness on a polymer sheet to create light diffusion for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduces thus extending the life of a battery. The preferred diffuse light transmission of the diffuser material of the invention are greater than 65%. Diffuser light transmission less than 60% does not let a sufficient quantity of light pass through the diffuser, thus making the diffuser inefficient. A more preferred diffuse light transmission of the microvoided thermoplastic voided layer is greater than 80%. An 80% diffuse transmission allows the LC device to improve battery life and increase screen brightness. The most preferred diffuse transmission of the voided thermoplastic layer is greater than 87%. A diffuse transmission of 87% allows diffusion of the back light source and maximizes the brightness of the LC device significant improving the image quality of an LC device for outdoor use where the LC screen must compete with natural sunlight.

Since the microvoids of the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble. A light diffuser with an impact resistance greater than 0.6 GPa is preferred. An impact resistance greater than 0.6 GPa allows the light diffuser to resist scratching and mechanical deformation that can cause unwanted uneven diffusion of the light causing "hot" spots in an LC device.

The invention may be used in conjunction with any liquid crystal display devices, typical arrangements of which are described in the following. Liquid crystals (LC) are widely used for electronic displays. In these display systems, a LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person, etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction. The diffuser acts to spread the light to increase viewing angle.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, complex light diffusion lenses of the invention were created by extrusion casting an extrusion grade polyolefin polymer against a patterned chill roll containing the complex lens geometry. The patterned chill roll also contained cylindrical spacers that extended beyond the surface of the complex light diffusion lenses. The patterned polyolefin polymer, in the form the complex lens and cylindrical spacers was then transferred to a polyester web material thereby forming a light diffuser with complex surface lenses and integral cylindrical spacers. This example will show that the cylindrical spacers added to the surface of the complex light diffusion lenses improve the light diffusion cone. Further, it will be obvious that the light diffuser containing the cylindrical spacers will be low in cost and have mechanical properties that allows for insertion into LC devices.

A patterned chill roll containing complex light diffusion lenses and cylindrical spacers was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features concave into the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex. The single lens patterned roll (control) was manufactured by starting with a copper roll blank and grit blasted with size 14 spherical grit at a pressure of 310 MPa. The resulting single lenses on the surface of the roll were concave. After application of the complex lenses geometry to the surface of the patterned roll, cylindrical spacers at depths of 50, 100 and 150 micrometers were machined into the roll utilizing precision drilling tooling. The cylindrical spacers were spaced in an ordered pattern with a 10 mm spacing between each cylindrical spacer.

The patterned chill roll containing the complex lenses and the cylindrical spacers were utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 g/m$^2$.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The chill roller contained separate areas for each of the three cylindrical spacers. The structure of the cast coated diffusion sheets is as follows, Formed polyolefin lenses with cylindrical spacers Transparent polyester base The light diffusion sheets containing formed polymer lenses and cylindrical spacers from above were measured for % light transmission, % diffuse light transmission, % specular light transmission and % diffuse reflectance. Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured. The measured values for the invention are listed in Table 1 below.

TABLE 1

|  | Invention |
|---|---|
| Total transmission measured at 500 nm | 92.4 |
| Diffuse transmission measured at 500 nm | 89.1 |
| Spectral transmission measured at 500 nm | 3.5 |
| Diffuse reflectance measured at 500 nm | 2.6 |

The invention materials were then assembled into an optical system by applying the complex lenses and the four cylindrical spacers (0, 50, 100 and 150 micrometers) to a 100 micrometer thick sheet of polyester that had a % light transmission of 93%. The invention materials were imaged through a detector, located behind the transparent polyester sheet using a 633 nanometer 0.02 W/cm$^2$ laser with a 3.0 mm beam diameter. The cone diameter for the four cylindrical spacers was calculated. The cone diameter was determined when the intensity dropped off to 10% of the peak intensity (normal to the detector). The cone diameter (measured in mm) for the cylindrical spacers is listed in Table 2 below,

TABLE 2

| Height of the Geometrical Spacer (micrometers) | Cone Diameter (mm) |
|---|---|
| 0 | 3.1 |
| 50 | 3.7 |
| 100 | 4.3 |
| 150 | 4.8 |

As the data in Table 1 above clearly indicates, complex polymer lenses formed on the surface of a transparent polymer provide excellent light diffusion and % transmission allowing for brighter liquid crystal display devices. The diffuse light transmission of 89.1% for the invention material is significantly better than typical prior art materials which generally have a % light transmission of 70%. The complex lens of the invention provides significantly more curved surface area for transmitted light diffusion compared to the prior art materials which typically comprise polymer beads coated in a matrix. Diffuse light transmission is important factor in the quality of a LC device in that the diffusion sheet must mask the pattern of the light guide common to LC devices. The total light transmission of the invention of 92.4% is also significantly improved over the prior art materials. By providing a lens that reduces internal scattering and reflection back toward the source, the invention materials allow for 92.4% of the light energy to pass through the diffuser resulting in a brighter liquid crystal display.

The data in Table 2 clearly demonstrate the utility of a geometrical spacer. As the geometrical spacing increases, the diameter of the light diffusion cone increased providing a tunable light diffuser. The precision spacing provided by the invention material allows for a fixed air gap when the invention materials are utilized with other optical components. When the height of the geometrical spacer was zero, the 3 mm light source was focused (3.1 mm) exiting the light diffuser. This light diffusion cone has commercial value in display devices that require a small but intense diffusion cone, devices such as a LC cell phone or a LC automobile gauge. At a spacing of 150 micrometers, the cone diameter increased to 4.8 mm providing a less intense but wider diffusion cone providing improvements to LC televisions or projection televisions were viewing angle and illuminance over a wide angle is valued.

Further, because the invention materials were constructed on an oriented polyester base, the materials have a higher elastic modulus compared to cast diffuser sheets. The geometrical spacer were integral to the surface of the light diffuser of the invention and therefore were low in cost and structurally attached to the surface of the light diffuser reducing the probability of detachment during the lifetime of the light diffuser. The geometrical spacers also provided separation between the diffuser sheet and the transparent polyester sheet, reducing the opportunity for scratching that can occur in portable devices that encounter significant vibration. Because the geometrical spacers of the invention comprise low density polyethylene, the geometrical spacers were soft and less prone to scratching compared to acrylic or PMMA polymers.

The geometrical spacer also provides impact resistance as the impact energy that is generated when a portable display device such as a cell phone is accidentally dropped, the air gap and the geometrical spacer have been shown to absorb the impact energy just as a mechanical spring would absorb energy, and reduce the impact forces on an LC matrix which has been typically constructed of glass. The precision air gap also creates thermal insulation between the high intensity light sources typical of LC devices and the delicate LC materials, which are heat sensitive. The insulation layer created by the geometrical spacer can provide longer LC lifetime and reduce the imaging variability caused by heating from the high intensity light sources.

While this example was primarily directed toward the use of thermoplastic light diffusion materials containing geometrical spacers for LC devices, the materials of the invention have value in other diffusion applications such as back light display, imaging elements containing a diffusion layer, a diffuser for specular home lighting and privacy screens, organic light emitting displays, image capture diffusion lenses and greenhouse light diffusion. The geometrical spacers also have value when used with other optical elements such as light directors, prism sheet, light guides and color filters.

Parts List
| | |
|---|---|
| 2. | Light guide |
| 4. | Lamp Reflector |
| 6. | Reflection tape |
| 8. | Reflection film |
| 10. | Reflection tape |
| 12. | Light diffusion film containing complex lenses and geometrical spacers |
| 14. | Brightness enhancement film |
| 16. | Polarization film |
| 18. | Visible light source |
| 20. | Transparent polymer base |
| 22. | Complex polymer light diffusion lens |
| 24. | Polymer geometrical spacer |

-continued

Parts List
| | |
|---|---|
| 26. | Surface of transparent polymer base |
| 31. | Film |
| 33. | Curved lenses |
| 35. | Cylindrical geometric spacers |
| 41. | Film |
| 43. | Ordered curved lenses |
| 45. | Ordered cylindrical geometric spacers |
| 51. | Film |
| 53. | Random curved lenses |
| 55. | Random cylindrical geometric spacers |
| 61. | Film |
| 63. | Curved lenses |
| 65. | Cylindrical geometric spacers |
| 71. | Film |
| 73. | Complex Lenses |
| 75. | Cylindrical geometric spacers |
| 76. | Thermoplastic layer |
| 77. | Thermoplastic polymeric material |
| 78. | Microvoids |
| 79. | Organic microspheres |
| 81. | Polymeric material |
| 83. | Slit die |
| 85. | Chill roll |
| 87. | Film with two roughness populations |

31. Film
33. Curved lenses
35. Cylindrical geometric spacers
41. Film
43. Ordered curved lenses
45. Ordered cylindrical geometric spacers
51. Film
53. Random curved lenses
55. Random cylindrical geometric spacers
61. Film
63. Curved lenses
65. Cylindrical geometric spacers
71. Film
73. Complex Lenses
75. Cylindrical geometric spacers
76. Thermoplastic layer
77. Thermoplastic polymeric material
78. Microvoids
79. Organic microspheres
81. Polymeric material
83. Slit die
85. Chill roll
87. Film with two roughness populations

What is claimed is:

1. An optical element containing a rough surface having a roughness average equal to at least 5 micrometers wherein the rough surface contains at least two roughness populations in which the roughness average of the at least two populations varies by at least 8 micrometers, wherein the optical element is a light diffuser wherein at least one of the roughness populations comprises a plurality of randomly distributed complex lenses, where each individual lens overlaps a piece of another lens, forms within another lens, or engulfs another lens, on at least one surface of the film and the randomly distributed complex lenses comprise randomly placed major lenses and randomly placed minor lenses.

2. The optical element of claim 1 wherein said optical element has a top and bottom surface containing said rough surface.

3. The optical element of claim 1 wherein the roughness average of the said at least two populations varies by at least 75 micrometers.

4. The optical element of claim 1 wherein the roughness average of the said at least two populations varies by at least 250 micrometers.

5. The optical element of claim 1 wherein said rough surface has a roughness average equal to a least 15 micrometers.

6. The optical element of claim 1 wherein said at least two roughness populations are random.

7. The optical element of claim 1 wherein said at least two roughness populations comprise one population that is ordered.

8. The optical element of claim 1 wherein said at least two roughness populations further comprise a plurality of integral geometric spacers.

9. The optical element of claim 8 wherein said plurality of integral geometric spacers comprise a cylinder.

10. The optical element of claim 8 wherein said integral geometric spacer comprises a sphere.

11. The optical element of claim 8 wherein said integral geometric spacer comprises a cube.

12. The optical element of claim 8 wherein said integral geometric spacer comprises a pyramid.

13. The optical element of claim 8 wherein said plurality of integral geometric spacers comprises a polymer.

14. The optical element of claim 8 wherein said integral geometric spacer comprises an inorganic particle.

15. The optical element of claim 8 wherein said plurality of integral geometric spacers has a light transmission greater than 80%.

16. The optical element of claim 8 wherein said plurality of integral geometric spacers has a haze of greater than 60%.

17. The optical element of claim 8 wherein said integral geometric spacers have a frequency of greater than 1.0 mm.

18. The optical element of claim 8 wherein said integral geometric spacers have a frequency between 5 and 25 mm.

19. The light diffuser of claim 1 wherein said complex lenses are concave lenses.

20. The light diffuser of claim 1 wherein the complex lenses have an average width in the x and y direction in the plane of the film of 3 to 60 microns.

21. The light diffuser of claim 1 wherein the complex lenses comprise major and minor lenses wherein the diameter of the minor lenses is on average less than 80% of the diameter of the major lens they are associated with.

22. The light diffuser of claim 1 wherein the diffuse light transmission is 80 to 95%.

23. The light diffuser of claim 1 wherein the complex lenses are semi-spherical.

24. The light diffuser of claim 1 wherein the complex lenses are aspherical.

25. The light diffuser of claim 1 wherein the complex lenses have a height/diameter ratio of 0.03 to 1.0.

26. The light diffuser of claim 1 comprising a thermoplastic layer containing thermoplastic polymeric material and microvoids having a substantially circular cross-section in a plane perpendicular to the direction of light travel and having a diffuse light transmission efficiency of at least 65%.

27. The light diffuser of claim 26 wherein the difference in refractive index between the thermoplastic polymeric material and the microvoids is greater than 0.2.

28. The light diffuser of claim 26 wherein said microvoids are formed by organic microspheres.

29. The light diffuser of claim 26 wherein said microvoids are substantially free of scattering inorganic particles.

30. The optical element of claim 1 wherein the optical element is comprised of at least two integral layers, the first layer containing complex polymer lenses and polymer cylinders which have a height at least 50 micrometers greater than the complex lenses, and the second layer serving as the substrate for the first layer.

31. The optical element of claim 30 wherein the cylinders have a diameter of about 25 micrometers and a frequency of about 20 mm.

32. A back lighted device comprising a light source and the optical element containing the rough surface of claim 1.

33. A liquid crystal device comprising a light source and the optical element containing the rough surface of claim 1, wherein the optical element is located between the light source and a polarizing film.

34. A method for forming at least two roughness populations in a desired pattern on a transparent support comprising the step of coating a melted layer of a polymeric material onto the support and cooling the material while subjecting the layer to contact with a form having a roughness pattern corresponding to the negative of the rough surface of claim 1.

35. A method for forming at least two roughness populations in a desired pattern on a polymeric material on a transparent support comprising continuously casting the polymeric material onto the support on a chill roll and cooling the material while subjecting the cast polymeric material to contact with a form having a roughness pattern corresponding to the negative of the rough surface of claim 1.

* * * * *